Jan. 27, 1931.   C. B. SPASE   1,790,285
TRANSMISSION MECHANISM
Filed Oct. 1, 1927   2 Sheets-Sheet 2

INVENTOR.
Charles B. Spase
BY Parsons & Brodell
ATTORNEYS.

Patented Jan. 27, 1931

1,790,285

UNITED STATES PATENT OFFICE

CHARLES B. SPASE, OF SYRACUSE, NEW YORK, ASSIGNOR TO BROWN-LIPE GEAR COMPANY, OF SYRACUSE, NEW YORK, A CORPORATION OF NEW YORK

TRANSMISSION MECHANISM

Application filed October 1, 1927. Serial No. 223,428.

This invention relates to a transmission mechanism particularly adapted for motor vehicles and more especially a mechanism comprising clutch and change speed transmission gearing combined in a unitary structure and means by which slight misalinements which would otherwise result in noisy gears, are nullified, engine and other vibrations and shocks absorbed, and sudden variations in the torque, cushioned. Other objects appear throughout the specification.

The invention consists in the novel features and in the combinations and constructions hereinafter set forth and claimed.

In describing this invention, reference is had to the accompanying drawings in which like characters designate corresponding parts in all the views.

Figure 1:
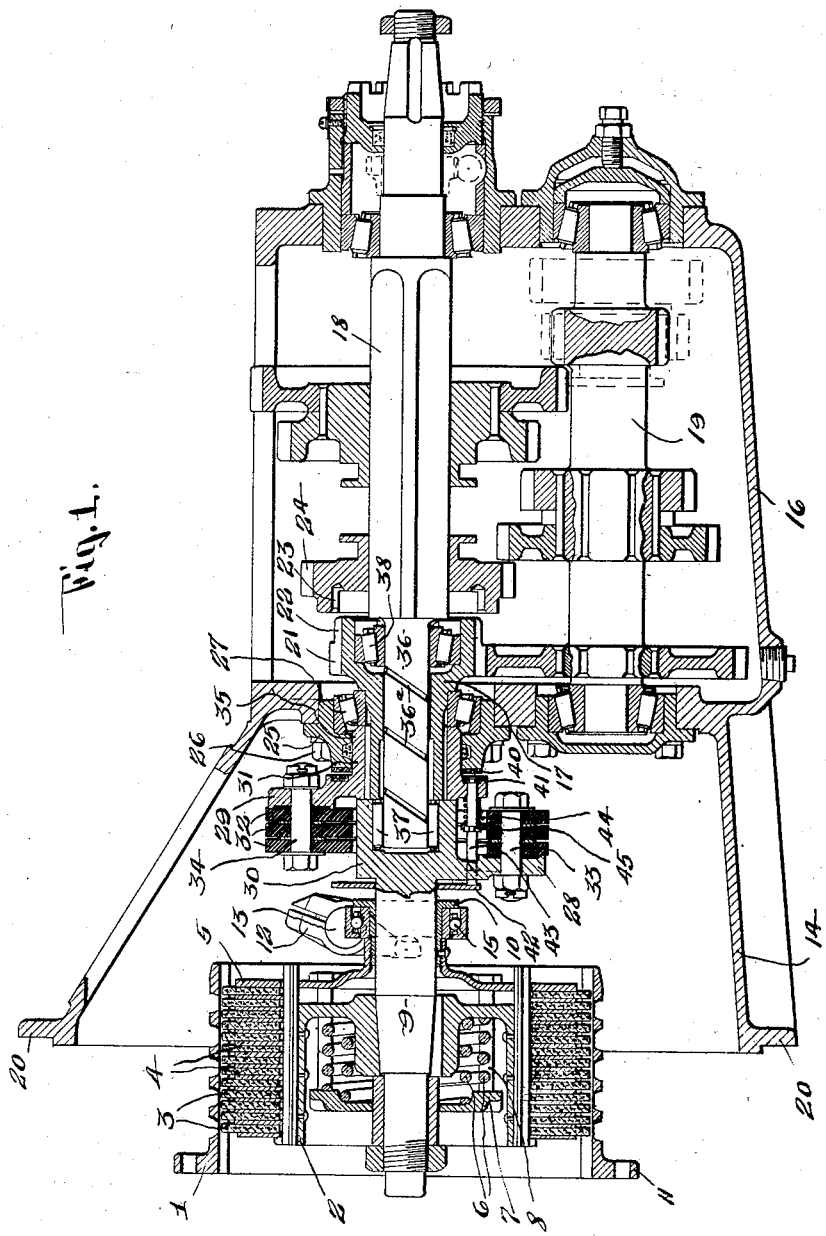
Figure 1 is a fragmentary longitudinal sectional view of a transmission mechanism embodying my invention, parts being omitted.
Figure 2:
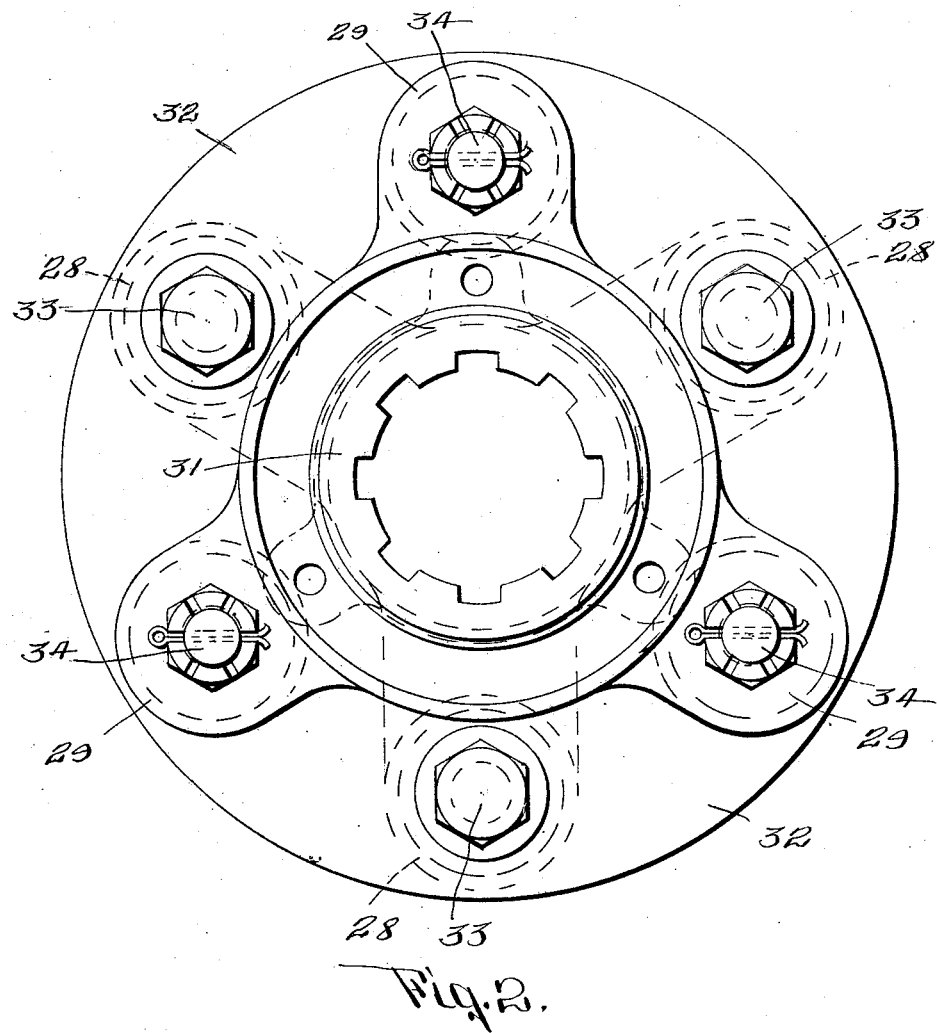
Figure 2 is an end view of the detached universal joint.

This transmission mechanism comprises generally, a clutch including a clutch shaft, a transmission gearing including a case and a shaft journalled in the case and projecting through a wall thereof toward the clutch shaft in axial alinement therewith and a flexible joint connecting the shafts, the gear case being a rigid unit with the clutch housing and the flexible joint being located in the clutch housing whereby the overall length of the clutch gearing construction is not appreciably increased.

The clutch may be of any suitable form, size and construction, that here shown being of the multiple disk type including an outer drum 1, an inner drum 2, sets of interleaved disks 3, 4 interposed between the drums, a pressure plate 5, a clutch spring 6 within the drum 2 and thrusting at one end against a spring abutment 7 and at its other end against the head of the inner drum 2, the abutment being connected by rods 8 to the pressure plate, a clutch shaft 9 on which the hub of the inner drum is mounted and a throw-out collar 10 slidable on the shaft 9 to disengage the clutch against the action of the spring 6.

The drum 1 as will be understood by those skilled in the art is bolted to the fly wheel of the engine in the usual manner, as by bolts extending through openings in an annular flange 11 on the drum 1; and the shaft 9 has a pilot bearing in the fly wheel or driver for the drum 1. The throw-out collar 10 also may be of any suitable form, size and construction and is operated by means of a yoke 12 mounted on shafts 13 journalled in the clutch housing 14, the yoke thrusting against a throw-out bearing 15 associated with the throw-out collar 10. The yoke 12 or the shafts 13 thereof are operated by the usual clutch pedal not shown.

Insofar as this invention is concerned, the form of clutch used is immaterial.

The transmission gearing may also be of any suitable form, size and construction and includes a case 16, a drive shaft 17 journalled in the front wall of the case, a transmission shaft 18 journalled in the rear wall of the case in axial alinement with the shaft 17, a jack shaft 19 journalled in the case 11, and a set of change speed gears between the shafts, some of these gears being shiftable.

The conventional type of change speed gearing is here shown and it is thought that as the operation and construction of various types of change speed gearing are well known, further description is unnecessary.

The gear case 16 is a unit with the clutch housing 14 and the clutch housing 14 is bolted to the crank case of the engine or the fly wheel housing by means of screws extending through a marginal flange 20 at the front end of the gear housing 14.

As will be understood by those skilled in the art, slight misalinements are bound to occur when mounting the unitary gear casing and clutch housing on the engine as it is impossible to exactly machine the faces of the flange 20 and of the surface against which it abuts so that they are both exactly at a right angle to the axis of the clutch shaft 9 and gears that are quiet when operated before being mounted in position on the chassis become noisy due to slight misalinements incidental to the mounting of the gear casing and one of the principal objects of this invention is to nullify the effect of such misalinements due to the assembly of the rigid gear casing and clutch housing to the engine casing.

The shaft 17 is here shown as tubular and formed integral with the gear 21 so that the gear 21 and shaft 17 form a stem gear, the gear 21 is also formed with an external toothed clutch face 22 coacting with a complemental internal toothed clutch face 23 on one of the sliding gears 24 of the gearing, these clutch faces 22 and 23 constituting what is usually known as the high speed clutch.

The case 16 includes bearing caps in which the various shafts are mounted and the shaft 17 is journalled in a bearing cap 25 detachably mounted in the front wall of the body of the gear case 16 and extending into the clutch housing 14, this cap being detachably held in position to the body of the gear case by screws 26. The shaft 17 is journalled in the cap 25 by a tapered anti-friction or roller bearing 27.

The flexible joint between the shafts 9 and 17 is here shown as of the flexible disk type and comprises sections mounted respectively on the shafts 9 and 17 and disks between the sections and connected as by bolts to said sections.

28 and 29 designate the sections which are in the form of spiders having three radially extending arms, the arms 28 being formed integral with a head 30 on the rear end of the shaft 9 and the spider arms 29 being formed integral with a hub 31 mounted on the shaft 17 to rotate therewith and being usually splined thereto.

32 designates the disks which are of a material capable of warping or flexing during the rotation of the shafts 9 and 17 in case there is any misalinement and the disks are secured to the spider arms 28 and 29 by bolts 33 and 34. As will be understood by those skilled in the art, these spider arms 28 and 29 are arranged out of alinement with each other or in different radial angles and are spaced equidistant apart. The hub 31 of the flexible joint section associated with the shaft 17 is also partly supported by the case 16 and in the illustrated embodiment of my invention, the hub has a bearing at 35 in the cap 25.

In the illustrated embodiment of my invention, the transmission shaft 18 of the gearing has a reduced portion 36 extending through the tubular shaft 17 and having a journal bearing at 37 in the rear end of the shaft 9 or the head 30 thereof and also this shaft 18 has a journal bearing 38 in the inner end of the shaft 17 or within the gear 21 integral therewith. The bearing 27 for the shaft 17 is located between this bearing 38 and the bearing of the flexible joint 29 in the gear casing 16 or cap 25 thereof. The portion 36 is formed with an oil duct 36ª for conveying lubricant from the gear case along said portion 36 to the bearing 37.

The transmission mechanism further includes a brake for stopping the rotation of the driven member of the clutch, that is, the member including the shaft 9 when the throw-out collar is operated to disengage the clutch and this brake includes coacting brake members provided respectively on the gear case 16 or the end of the cap 25 and on the flexible joint member 29 and an operating part arranged in the path of the throw-out collar 10 between the throw-out collar and the flexible joint section 28 and connections carried by the flexible joint sections between the operating part and the brake member associated with the flexible joint section 29.

40 designates a brake member or ring usually of a fibrous material mounted at the end of the bearing cap 25 around the hub 31 of the flexible joint section 29.

41 is a shiftable brake member usually of metal associated with the flexible joint member 29 and arranged to coact with the brake member 40 when shifted into engagement therewith.

42 is the operating or shifting part for the brake ring 41, this being located in the path of the throw-out collar 10. The connections between this operating part and the brake ring 29 consists of rods 43, there being usually three of them slidably mounted in the flexible joint sections 28 and 29 and extending through recesses or holes in the disks 32, like ends of these rods 43 being secured as by rivets to the brake ring 41 and their other ends being arranged in the path of the shifting part 42. Returning springs 44 are interposed between the flexible joint section 29 and collars 45 on the rods to return the brake ring 41 to its normal position and hence, return the shifting part 42 to its normal position when the clutch is reengaged and hence, the throw-out collar 10 moved out of engagement with the shifting member 42.

This construction is particularly advantageous in that the flexible joint is assembled with the clutch and transmission gearing and in a particularly, simple, compact and durable manner without appreciably increasing the overall length of the clutch and gear structure and in addition provides a way for mounting a flexible joint in any situation close to or partly in a case, and furthermore, the flexible joint not only acts to correct misalinements and absorb vibrations but also acts as a torque cushioner to protect the gears and engine against shocks due to too quick acceleration of the engine and to the reengagement of the engine clutch after gear shifting operations or after coasting, and also of shock being constantly transmitted forwardly from the driving wheels through the propeller shaft.

What I claim is:

1. In a transmission mechanism, a clutch comprising a clutch shaft, a transmission gearing including a case and a shaft journalled in the case and projecting through a wall thereof in axial alinement with the clutch shaft and a flexible joint connecting said shafts comprising sections mounted respectively on the shafts, the section mounted on the shaft of the gearing having a hub also mounted in the gear case.

2. In a transmission mechanism, a clutch comprising a clutch shaft, a transmission gearing including a case and a shaft having a journal bearing in the case, the shaft projecting through a wall of the case in axial alinement with the clutch shaft and a flexible joint connecting the shafts comprising sections mounted respectively on the shafts, the section mounted on the shaft of the gearing having a hub located near the journal bearing of said shaft of the gearing and also the case having a bearing for said hub between the bearing for the shaft of the gearing and the outer end of said shaft.

3. In a transmission mechanism, a clutch comprising a clutch shaft, a transmission gearing including a case having a detachable bearing cap in the wall thereof adjacent the clutch and a shaft journalled in said cap and extending to the outside thereof in axial alinement with the clutch shaft, a flexible joint connecting the shafts and comprising sections mounted respectively on the shafts, the section member mounted on the shaft of the gearing having a hub journalled in said cap.

4. A transmission mechanism comprising a clutch including a clutch shaft and a transmission gearing including a case, a drive shaft and a transmission shaft mounted in concentric relation in axial alinement in opposite walls of the case, said shafts being also mounted end to end in axial alinement with the clutch shaft, the transmission shaft having a portion extending axially through the drive shaft of the gearing and journalled in the end of the clutch shaft, and means between the clutch shaft and one of the other of said shafts for transmitting power thereto.

5. A transmission mechanism comprising a clutch including a clutch shaft and a transmission gearing including a case, a drive shaft and a transmission shaft mounted in concentric relation in axial alinement in opposite walls of the case, said shafts being also mounted end to end in axial alinement with the clutch shaft, the transmission shaft having a portion extending axially through the drive shaft of the gearing and journalled in the end of the clutch shaft, the drive shaft of the gearing having a journal bearing in the case and the transmission shaft having a journal bearing in the drive shaft, and driving means between the clutch shaft and the drive shaft.

6. A transmission mechanism comprising a clutch including a clutch shaft, a transmission gearing including a casing, a drive shaft and a transmission shaft mounted in axial alinement in opposite walls of the case, said shafts being also mounted in axial alinement with the clutch shaft, the transmission shaft having a portion extending axially through the drive shaft of the gearing and journalled in the end of the clutch shaft, the drive shaft of the gearing having a journal bearing in the case and the transmission shaft having a journal bearing in the drive shaft and a flexible joint connecting the clutch shaft and the drive shaft of the gearing comprising sections mounted respectively on the clutch shaft and the drive shaft.

7. A transmission mechanism comprising a clutch including a clutch shaft, a transmission gearing including a case, a drive shaft and a transmission shaft mounted in axial alinement in opposite walls of the case, said shafts being also mounted in axial alinement with the clutch shaft, the transmission shaft having a portion extending axially through the drive shaft of the gearing and journalled in the end of the clutch shaft, the drive shaft of the gearing having a journal bearing in the case and the transmission shaft having a journal bearing in the drive shaft, and a flexible joint connecting the clutch shaft and the drive shaft of the gearing comprising sections mounted respectively on the clutch shaft and the drive shaft, the section mounted on the drive shaft having a bearing in the gear case.

8. A transmission mechanism comprising a clutch including a clutch shaft, a transmission gearing including a case, a drive shaft and a transmission shaft mounted in axial alinement in opposite walls of the case, said shafts being also mounted in axial alinement with the clutch shaft, the transmission shaft having a portion extending axially through the drive shaft of the gearing and journalled in the end of the clutch shaft, the drive shaft of the gearing having a journal bearing in the case and the transmission shaft having a journal bearing in the drive shaft, and a flexible joint connecting the clutch shaft and the drive shaft of the gearing comprising sections mounted respectively on the clutch shaft and the drive shaft, the section mounted on the drive shaft having a bearing in the gear case, the journal bearing of the drive shaft being located between the journal bearing for the transmission shaft in said drive shaft and the bearing of the universal joint section in the gear case.

9. The combination of a case, three shafts arranged in axial alinement, one of the shafts having a portion extending axially through the intermediate shaft and having a journal bearing in the third shaft, a flexible joint connecting the intermediate shaft and the third shaft and comprising a section having a hub mounted on the intermediate shaft and journalled in the case.

10. In a transmission mechanism, a clutch including a clutch shaft and a throw-out collar movable axially of the shaft, a transmission gearing including a case and a shaft journalled in the case and projecting through a wall thereof in axial alinement with the clutch shaft and terminating near the rear end of the clutch shaft, a flexible joint connecting said shafts and comprising sections mounted respectively on the opposing ends of the shafts and a brake for retarding the rotation of the clutch when disengaged, the brake comprising coacting members associated with the case and the flexible joint section opposed to the case, an operating part arranged in the path of the throw-out collar and movable axially of the shaft by the throw-out collar and connections between the operating part and the brake member associated with the flexible joint member, said connections extending through the flexible joint.

11. In a transmission mechanism, a clutch including a clutch shaft and a throw-out collar movable axially of the shaft, a transmission gearing including a case and a shaft journalled in the case and projecting through a wall thereof in axial alinement with the clutch shaft and terminating near the rear end of the outer clutch shaft, a flexible joint connecting said shafts and comprising sections mounted respectively on the opposing ends of the shafts and a brake for retarding the rotation of the clutch when disengaged, the brake comprising coacting members associated with opposing surfaces of the case and the flexible joint section opposed to the case, an operating part arranged in the path of the throw-out collar and movable axially of the shaft by the throw-out collar and connections between the operating part and the brake member associated with the flexible joint section, said connections comprising push rods interposed between the operating member and the shiftable brake member and slidable through the flexible joint and returning springs for resisting movement of the rods.

12. In a transmission mechanism, a clutch comprising a clutch shaft, a transmission gearing including a case having an extension forming a housing for the clutch and a shaft journalled in the case and projecting through a wall thereof into the clutch housing in axial alinement with the clutch shaft and end to end therewith, and a flexible joint located in the clutch housing and connecting the opposing ends of said shafts, the flexible coupling comprising sections associated respectively with the clutch shaft and the shaft of the transmission gearing, the latter section being journalled in a bearing in the wall of the gear case.

In testimony whereof, I have hereunto signed my name, at Syracuse, in the county of Onondaga and State of New York, this 22nd day of September, 1927.

CHARLES B. SPASE.